US008272952B2

(12) United States Patent
Manning et al.

(10) Patent No.: US 8,272,952 B2

(45) Date of Patent: Sep. 25, 2012

(54) GAMING SYSTEM HAVING DYNAMIC PLAYER INPUTS

(75) Inventors: Brian Manning, Las Vegas, NV (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 266 days.

(21) Appl. No.: 12/676,434

(22) PCT Filed: Aug. 28, 2008

(86) PCT No.: PCT/US2008/010184

§ 371 (c)(1), (2), (4) Date: Mar. 4, 2010

(87) PCT Pub. No.: WO2009/032151

PCT Pub. Date: Mar. 12, 2009

(65) Prior Publication Data

US 2010/0173705 A1 Jul. 8, 2010

Related U.S. Application Data

(66) Substitute for application No. 60/967,574, filed on Sep. 5, 2007.

(51) Int. Cl.
*G06F 17/00* (2006.01)

(52) U.S. Cl. ................ 463/30; 463/16; 463/20; 463/36; 463/37; 273/138.1; 273/138.2; 273/139; 200/296; 345/156; 345/173

(58) Field of Classification Search .............. 463/16–21, 463/30, 36–37, 42, 46; 273/85, 138, 138.1, 273/138.2, 138 A, 139, 143 R, 148, 237, 273/269; 200/5 D, 5 E, 43.18, 50.36, 295–296, 200/276.1, 314, 341, 345, 412, 417, 422, 200/510, 520, 530; 345/156, 173–174, 178–180; 73/1.19, 1.23, 1.56; 40/315, 464; 74/473.3, 74/483 PB See application file for complete search history.

(56) References Cited

U.S. PATENT DOCUMENTS

| | | | | |
|---|---|---|---|---|
| 5,754,176 | A | 5/1998 | Crawford | |
| 6,104,393 | A | 8/2000 | Santos-Gomez | |
| 6,121,960 | A | 9/2000 | Carroll et al. | |
| 6,159,095 | A * | 12/2000 | Frohm et al. | 463/19 |
| 6,404,441 | B1 | 6/2002 | Chailleux | |
| 7,120,872 | B2 | 10/2006 | Thacker | |

(Continued)

OTHER PUBLICATIONS

International Search Report corresponding to International Patent Application Serial No. PCT/US2008/010184, dated Nov. 18, 2008; 1 page.

(Continued)

*Primary Examiner* — Arthur O. Hall

(74) *Attorney, Agent, or Firm* — Nixon Peabody LLP

(57) ABSTRACT

A gaming system comprises a wager input device, a display for displaying a primary wagering game, and a touch screen overlying at least a portion of the display. The system further includes a controller operative to (i) cause the display to display at least one soft key, the soft key overlying and concealing a first portion of the primary wagering game, (ii) cause the display to display a play of the primary wagering game, and (iii) during the play of the primary wagering game, cause the display to present an altered display of the soft key to reveal some or all of the first portion.

21 Claims, 8 Drawing Sheets

U.S. PATENT DOCUMENTS

| | | | | |
|---|---|---|---|---|
| 7,270,604 | B2 * | 9/2007 | Gerrard et al. | 463/16 |
| 7,341,513 | B2 * | 3/2008 | Cuddy et al. | 463/20 |
| 7,371,169 | B2 * | 5/2008 | Baerlocher | 463/20 |
| 7,887,409 | B2 * | 2/2011 | Baerlocher et al. | 463/20 |
| 2005/0054404 | A1 * | 3/2005 | Baerlocher | 463/9 |
| 2005/0215311 | A1 * | 9/2005 | Hornik et al. | 463/20 |
| 2006/0025196 | A1 * | 2/2006 | Webb et al. | 463/16 |
| 2006/0063583 | A1 | 3/2006 | Thomas | |
| 2006/0156247 | A1 * | 7/2006 | McCormack et al. | 715/767 |
| 2006/0287101 | A1 * | 12/2006 | Crawford et al. | 463/42 |
| 2006/0287104 | A1 * | 12/2006 | White et al. | 463/42 |
| 2007/0060249 | A1 * | 3/2007 | Gomez et al. | 463/16 |
| 2007/0184893 | A1 * | 8/2007 | Fujimoto | 463/20 |
| 2008/0020840 | A1 * | 1/2008 | Wells et al. | 463/31 |
| 2008/0058103 | A1 * | 3/2008 | Kovacic et al. | 463/37 |
| 2008/0307488 | A1 | 12/2008 | Hammond, II et al. | |
| 2009/0083673 | A1 | 3/2009 | Fitzmaurice et al. | |

OTHER PUBLICATIONS

International Preliminary Report on Patentability corresponding to International Patent Application Serial No. PCT/US2008/010184, dated Feb. 12, 2010; 4 pages.

* cited by examiner

GAMING SYSTEM HAVING DYNAMIC PLAYER INPUTS

CROSS REFERENCE TO RELATED APPLICATIONS

This application is a U.S. national stage filing of International Application No. PCT/2008/010184, filed Aug. 28, 2008, claiming priority from U.S. Provisional Application No. 60/967,574, filed Sep. 5, 2007, which are both incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having dynamic player inputs.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Some gaming devices have employed player inputs comprising touch screens overlying video displays. In such configurations, soft keys or soft buttons are presented to the player via the video display and player inputs are sensed by the touch screen when players "press" one or more of the soft keys. With the development of handheld gaming devices, the size of video displays offered on such devices has decreased. One problem that arises is that smaller sized displays offer limited areas in which to display both the soft keys and the wagering game elements simultaneously or contemporaneously. Yet another problem is that configuring such smaller displays often results in the size of soft keys being either too small (to accommodate a plurality of soft keys) making them difficult to isolate or touch, or too large, thereby taking up too much of the display and limiting the territory of the display screen available for the wagering game presentation. The present invention is directed to solving these and other problems.

SUMMARY OF THE INVENTION

According to one aspect of the present invention, a gaming system comprises a wager input device, a display for displaying a primary wagering game, and a touch screen overlying at least a portion of the display. The system further includes a controller operative to (i) cause the display to display at least one soft key, the soft key overlying and concealing a first portion of the primary wagering game, (ii) cause the display to display a play of the primary wagering game, and (iii) during the play of the primary wagering game, cause the display to present an altered display of the soft key to reveal some or all of the first portion.

According to another aspect of the invention, a method of operating a wagering game comprises receiving a wager, displaying a primary wagering game on a first display, and displaying a first soft key overlying and concealing a first portion of the primary wagering game. The method further comprises detecting a player input to initiate a play of the primary wagering game, and during the play of the primary wagering game, altering the first soft key to reveal at least part of the first portion.

According to yet another aspect of the invention, a method of operating a wagering game comprises receiving a wager, displaying a primary wagering game on a first display, and displaying a soft key overlying and concealing a first portion of the primary wagering game. The method further comprises detecting a player selection of the soft key via a touch screen overlying the first display, and in response to the player selection of the soft key, initiating a play of the primary wagering game. The method further comprises, during the play of the primary wagering game, altering the display of the soft key to reveal at least part of the first portion.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
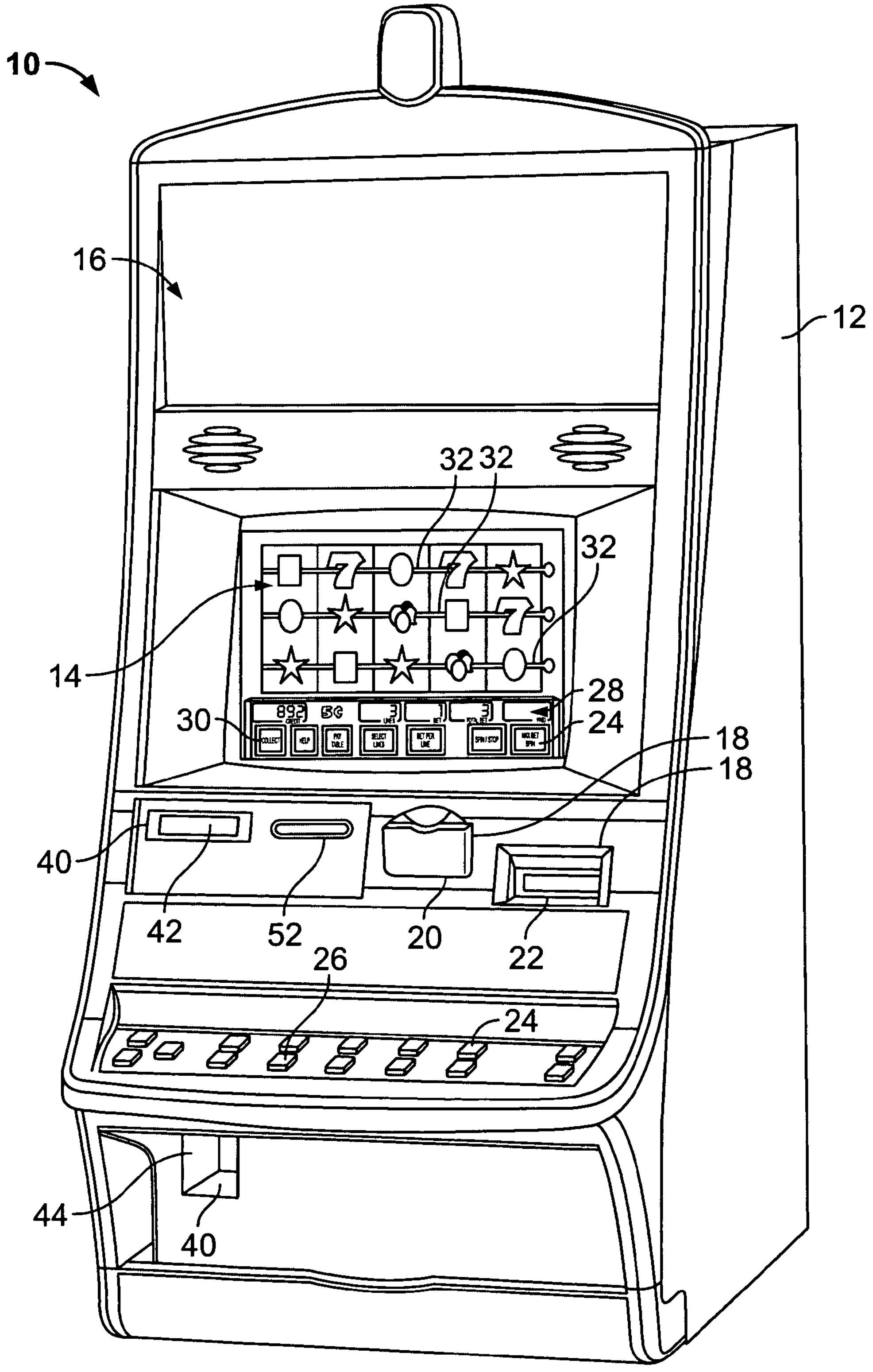
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
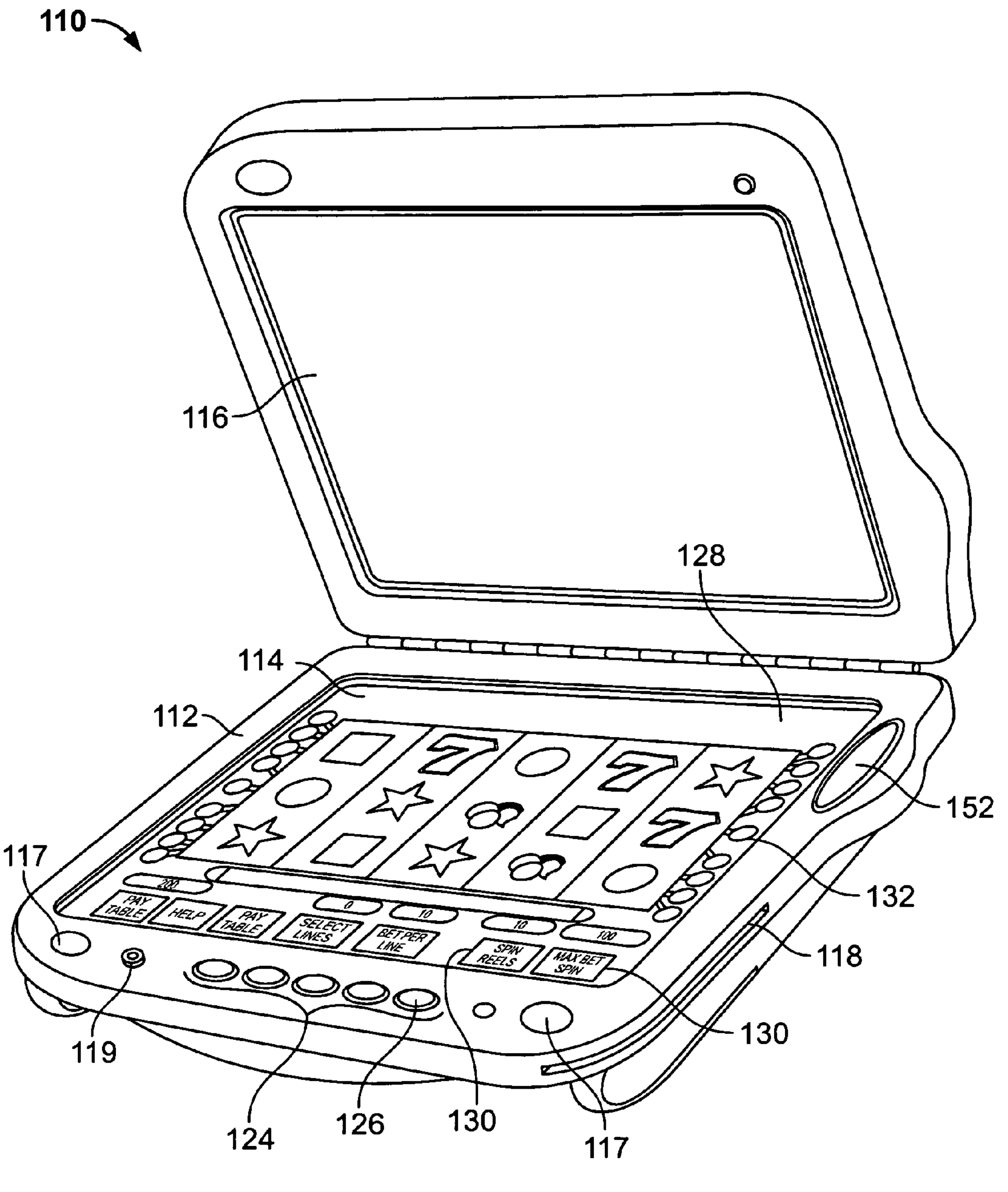
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
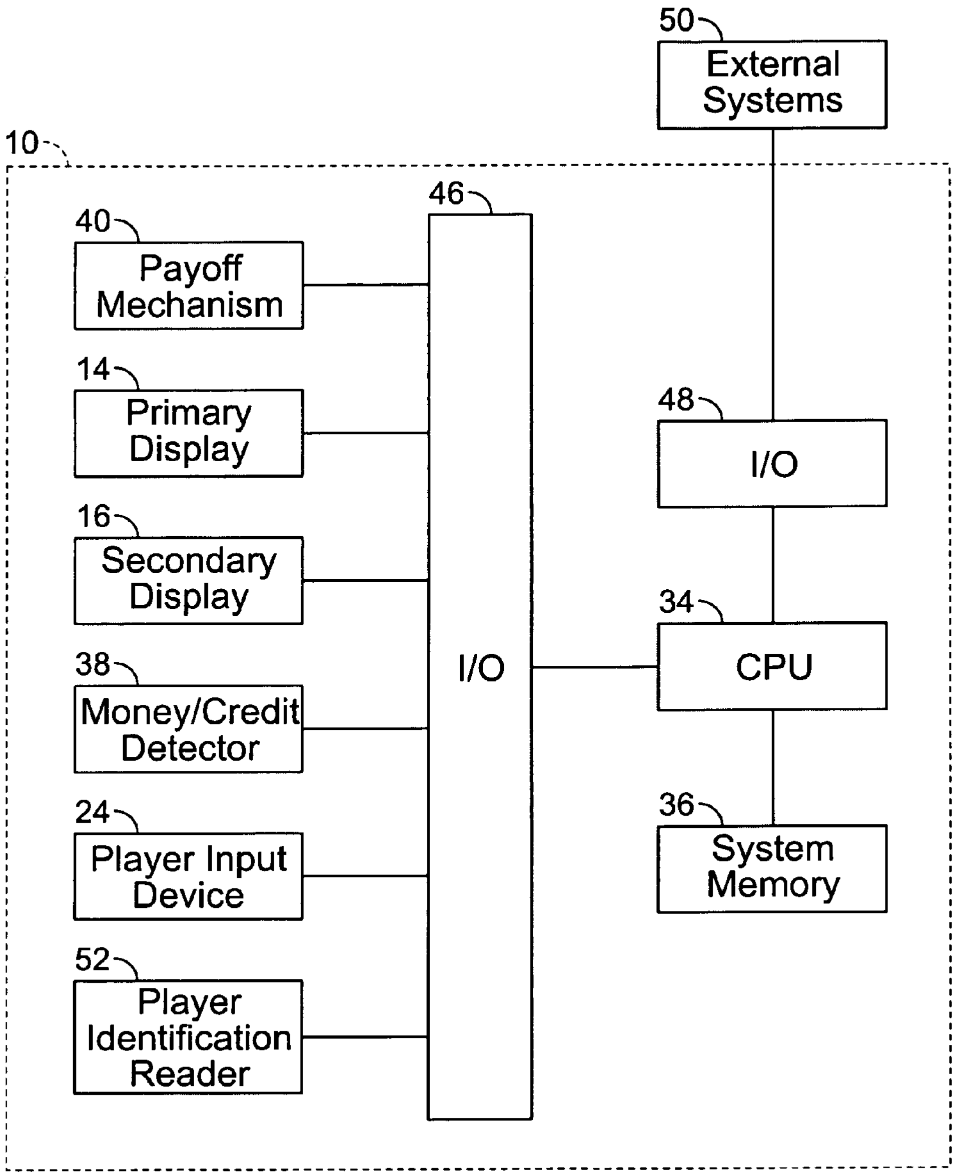
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
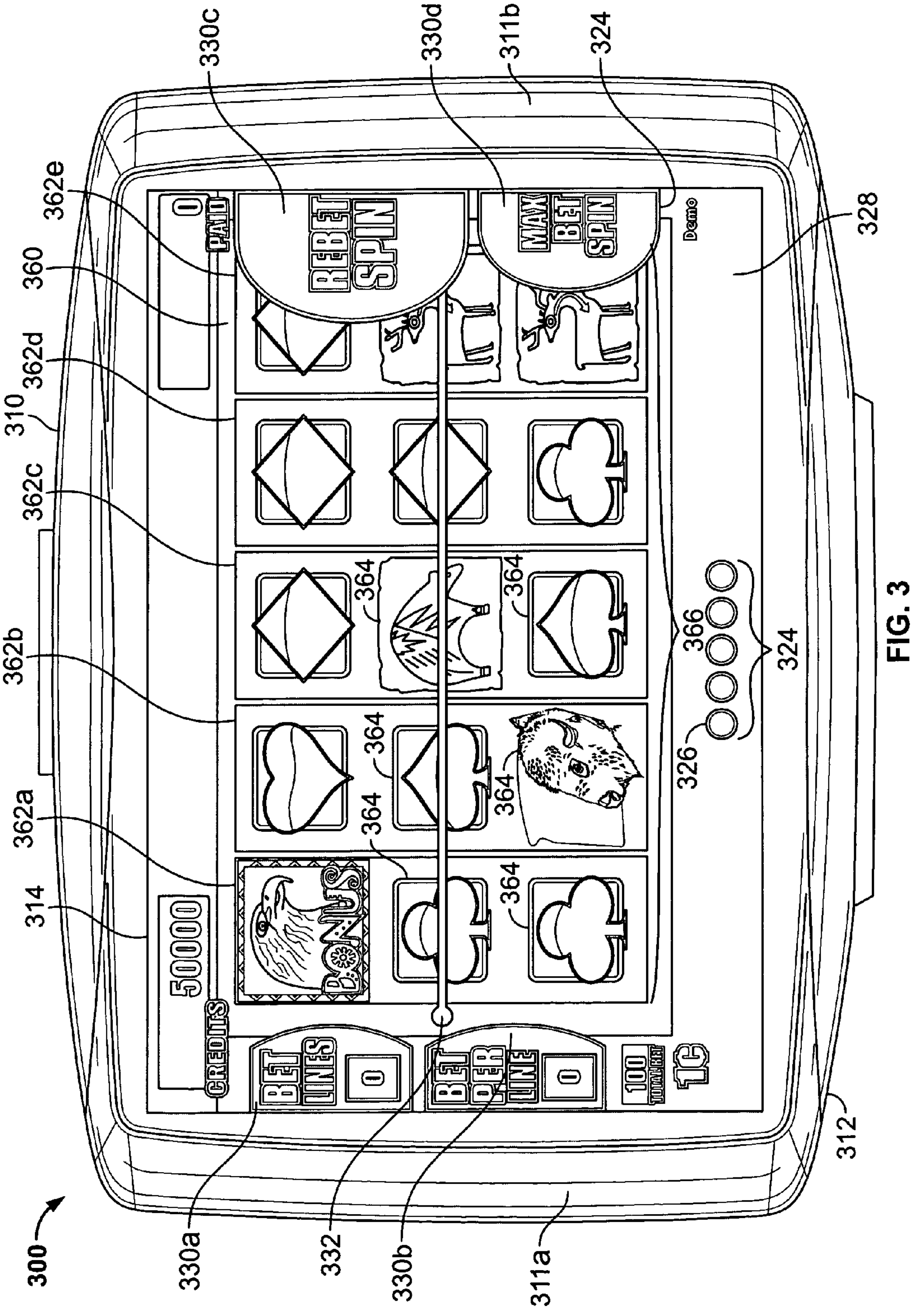
FIG. 3 is a front view of a handheld gaming device including dynamic player inputs.

Turning now to FIG. 3, a primary display 314 of a gaming device 310 of a gaming system 300 is shown. The primary display 314 may be any form of display such as those described herein with reference to the free standing and handheld gaming devices of FIGS. 1*a* and 1*b*. In the embodiment shown, the gaming device 310 is a handheld device having similar features as the handheld device described with reference to FIG. 1*b*. The primary display 314 includes display of a primary wagering game 360, which in this embodiment is a slot game as shown in FIG. 3. The slot game 360 includes a plurality of reels 362*a,b,c,d,e* which may be either electromechanical reels or simulations thereof on the primary display 314. The reels 362*a,b,c,d,e* include a plurality of symbols 364 displayed thereon which vary as the reels 362*a,b,c,d,e* are spun and stopped.

The symbols 364 may include any variety of graphical symbols, elements, or representations, including symbols 364 which are associated with one or more themes of the gaming machine or system. The symbols 364 may also include a blank symbol, or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is four rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

In addition, the primary display 314 includes a player input device 324. In the embodiment shown, the player input device 324 comprises a touch screen 328 overlying a portion (or all) of the primary display 314. The touch screen 328 is matched to a the primary display 314 which displays one or more selectable soft keys or touch keys 330 selectable by a user by touching the associated area of the screen using a finger or a tool, such as a stylus pointer. In addition, or alternatively, the player input device 324 may comprise a plurality of mechanical or electro-mechanical push buttons 326 for operating the handheld gaming device 310. A player enables a desired function either by touching the touch screen 328 at an appropriate touch key 330 or by pressing an appropriate push button 326 on the button panel. The touch keys 330 may be used to implement the same or different functions as push buttons 326.

As seen in FIG. 3, four touch keys 330*a,b,c,d* are provided, which are a Lines Bet button 330*a*, a Bet Per Line button 330*b*, a Rebet Spin button 330*c*, and a Max Bet Spin button 330*d*. The Lines Bet button 330*a* and the Bet Per Line button 330*b* are located on along or proximate a left edge of the primary display 314. Similarly, the Rebet Spin button 330*c* and the Max Bet Spin button 330*d* are located along a right edge of the primary display 314. In this way, two of the touch keys 330*a,b* are located proximate a left hand grip 311*a* of the gaming device 310, and two of the touch keys 330*c,d* are located proximate a right hand grip 311*b* of the gaming device 310. The two hand grips 311*a,b* are affixed to a housing 312 of the gaming device 310 and provide an area in which the device 310 is to be held and supported during operation. In this way, the touch keys 330 are positioned near the hand grips 311 so as to be able to be operated more easily, for example, by a player using his thumbs while the rest of his fingers support the device 310 by the hand grips 311. One or more of the touch keys 330 may overlie a portion of the wagering game 360. In an embodiment, the display of the wagering game 360 includes an active portion of the wagering game 360 (indicia and visual elements which represent and indicate outcomes of the wagering game) and inactive portions of the wagering game 360 (non-essential indicia such as decorative graphics, animations, borders, etc). As seen in FIG. 3, the Lines Bet button 330*a* and the Bet Per Line button 330*b* overlie an inactive portion of the left side of the wagering game 360, but do not encroach on any of the active portion of the wagering game 360 (e.g. the reels 362 or symbols 364 thereon). However, the Rebet Spin button 330*c* and the Max Bet Spin button 330*d* overlie an active portion of the wagering game 360 comprising a portion of the fifth reel 362*e* and the symbols thereon, so as to block a portion of the reel 362*e* and the symbols 364 thereon.

The Lines Bet button 330*a* is operated to select and activate a desired number of paylines from a set of available paylines. In an embodiment, as the player touches the Lines Bet button 330*a*, the number of paylines activated increases from a minimum number (e.g. one payline), up to a maximum number (e.g. 30 paylines). In one configuration, for each touch of the Lines Bet button 330*a*, the number of activated paylines increases by a predetermined number, for example one payline, to display the current number of activated payline in a label on the Lines Bet button 330*a*. The Bet Per Line button 330*b* is touched to increase the number of credits wagered per payline from a minimum wager (e.g. one credit) to a maximum wager (e.g. 20 credits) per payline. In an embodiment, for each touch of the Bet Per Line button 330*b*, the bet is increased by one credit per line, and is displayed in a label on the Bet Per Line button 330*b*.

The Rebet Spin button 330*c* and the Max Bet Spin button 330*d* are used to initiate the play of the primary wagering game 360. The Rebet Spin button 330*c* initiates a play (e.g. a spin) of the primary wagering game 360 and places a wager equal to the wager on the previous play of the wagering game 360. In this way, a player can use the Lines Bet button 330*a* and the Bet Per Line button 330*b* to configure his desired size of wager, and then by repetitively pressing the Rebet Spin button 330*c*, the player can activate successive plays of the primary wagering game 360 using that desired bet configuration. At any time between plays of the primary wagering game 360, the player can reconfigure the betting structure, and recommence play with a new configuration by pressing the Rebet Spin button 330*c* again. The Max Bet Spin button 330*d* can be used by the player to place a maximum wager (e.g. 20 credits per line) at any time without having to manually reconfigure the betting structure by using the Lines Bet button 330*a* and the Bet Per Line button 330*b*. Thus, with one quick input, the player can touch the Max Bet Spin button 330*d* to initiate a play of the primary wagering game 360 for a maximum wager.

In other embodiments, many other touch keys 330 may be utilized and configured so as to provide a variety of inputs relating to the primary wagering game 360. For example, the touch keys 330 may be customizable by a player so that the player can populate the display 314 with input selections of his choice, such as "Bet 5 credits" or "Activate 10 Paylines." Moreover, the player may be given options as to the layout of the touch keys 330 and may be permitted to customize their size, location, color, etc. The instructions and game inputs provided on the various touch keys 330 may correspond to a very large and virtually limitless number of game functions.

Figure 4:
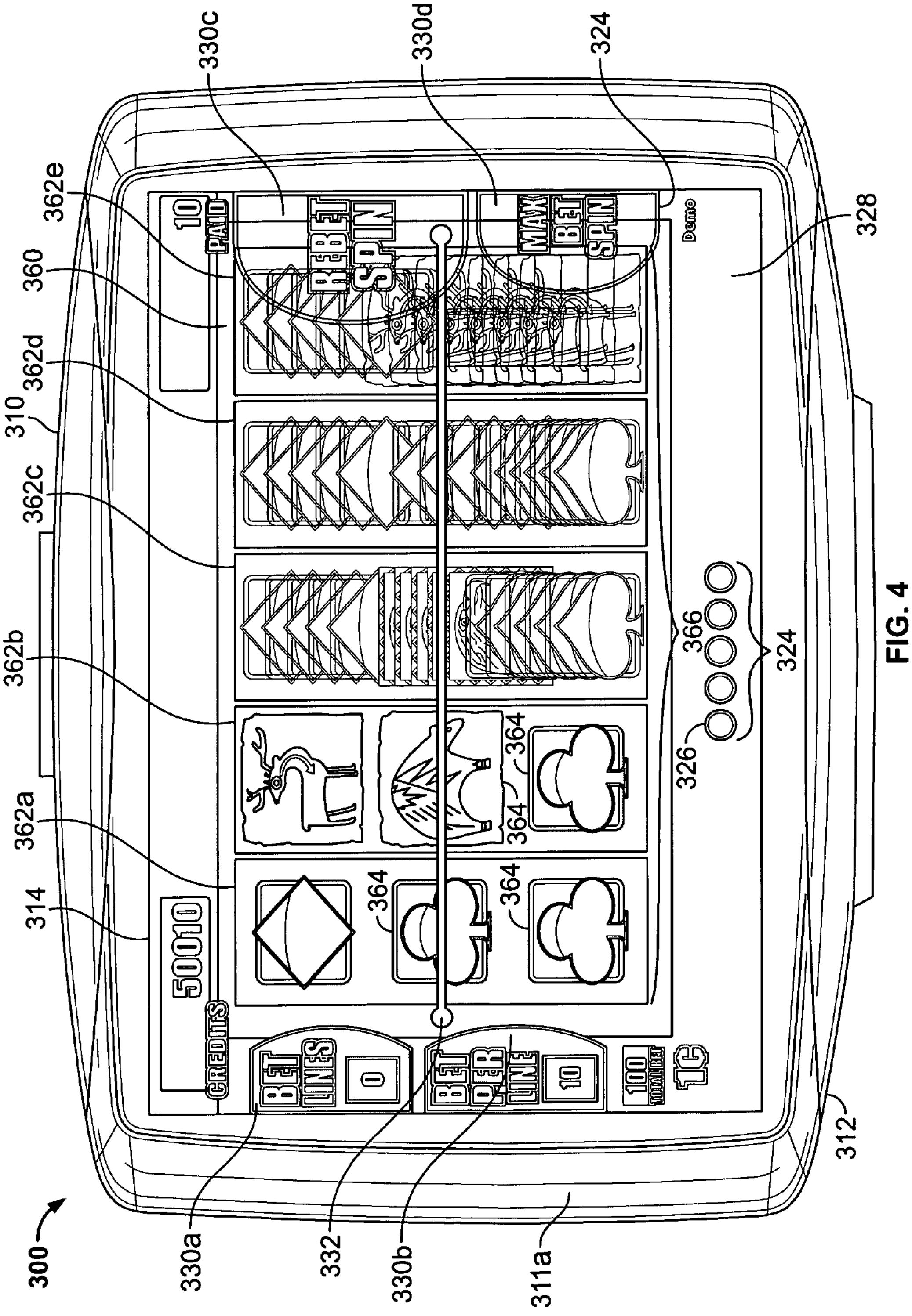
FIG. 4 is a further view of the handheld gaming device of FIG. 3 depicting a play of the primary wagering game displayed thereon.

Turning to FIG. 4, the handheld gaming device 310 is displayed after a play of the primary wagering game 360 has been initiated. A player of the wagering game 360 has pressed the Rebet Spin button 330*c* and the primary wagering game 360 is executed by spinning and stopping the various reels 362 to display a randomly selected outcome of the wagering game 360. When the Rebet Spin button 330*c* is touched and the game 360 begins, the Rebet Spin button 330*c* and the Max Bet Spin button 330*d* are dynamically changed or altered. In the embodiment shown, touching either of the two spin buttons 330*c,d* causes the buttons 330*c,d* to become translucent or transparent so that the portion of the wagering game 360 (e.g. the fifth reel 362*e*) which lies beneath the buttons 330*c,d* is visible. In this way, the portion of the reel 362*e* and the symbols 364 thereon which were previously concealed and covered by the buttons 330*c,d* now become visible through the buttons 330*c,d* as the buttons 330*c,d* are dynamically altered to become translucent or transparent. Thus, as the game is being played, the buttons 330*c,d* which overlie a portion of the wagering game 360 are "removed" so that the game 360 is more visible, and therefore more enjoyable.

This configuration permits the buttons 330*c,d* which overlie the primary wagering game 360 to be larger and more visible when the game is inactive, so as to be easier to read and more easily selected. Moreover, the dynamic nature of the buttons 330*c,d* permits them to be "removed" or minimized by being turned transparent or translucent, such that the buttons 330*c,d* yield to the display of the primary wagering game 360 when the game 360 is active and the buttons 330*c,d* are not being utilized or are unnecessary. In this way, the dynamic buttons 330*c,d* and primary wagering game 360 alternate to share a portion of the primary display 314 when active, and yield to the other when inactive. This maximizes the usage of the area of the primary display 314 by using more area or "real estate" of the display 314 for the active feature, and less area of the display 314 for the inactive feature. At the conclusion of the play of the wagering game 360, the dynamic soft keys 330*c,b* may be returned to their original state, such as the solid configuration shown in FIG. 3. Thus, the buttons 330*c,d* are again available to be activated to initiate a subsequent spin or play of the wagering game 360.

It should be understood that the touch screen 330 overlying the display 314 may be deactivated while the buttons 330*c,d* are placed in an inactive state (the transparent or translucent configuration of FIG. 4). Thus, as the primary wagering game 360 is displayed and executed, the touch screen 300 may be deactivated and not responsive to touch inputs of a player using the touch keys 330. In one embodiment, all of the touch keys 330 are deactivated during the play of the wagering game 360. In an alternative configuration, only the dynamic buttons 330*c,d* are deactivated. Thus, as seen in FIG. 4, although the Rebet Spin and Max Bet Spin buttons 330*c,d* have been deactivated (displayed as transparent or translucent), the Lines Bet and Bet Per Line buttons 330*a,b* remain in the same solid configuration as FIG. 3 to signify that those buttons 330*a,b* are still activated and usable by a player. Thus, in the embodiment shown in FIGS. 3 and 4, once play of the wagering game 360 commences and the reels 362 are spinning, the Spin buttons 330*c,d* are deactivated and thus unusable, but the bet buttons 330*a,b* are still activated and usable by a player. In other embodiments, other configurations may be used so as to designate which sets or subsets of touch keys 330 are deactivated or remain active during play of the wagering game 360.

Figure 5:
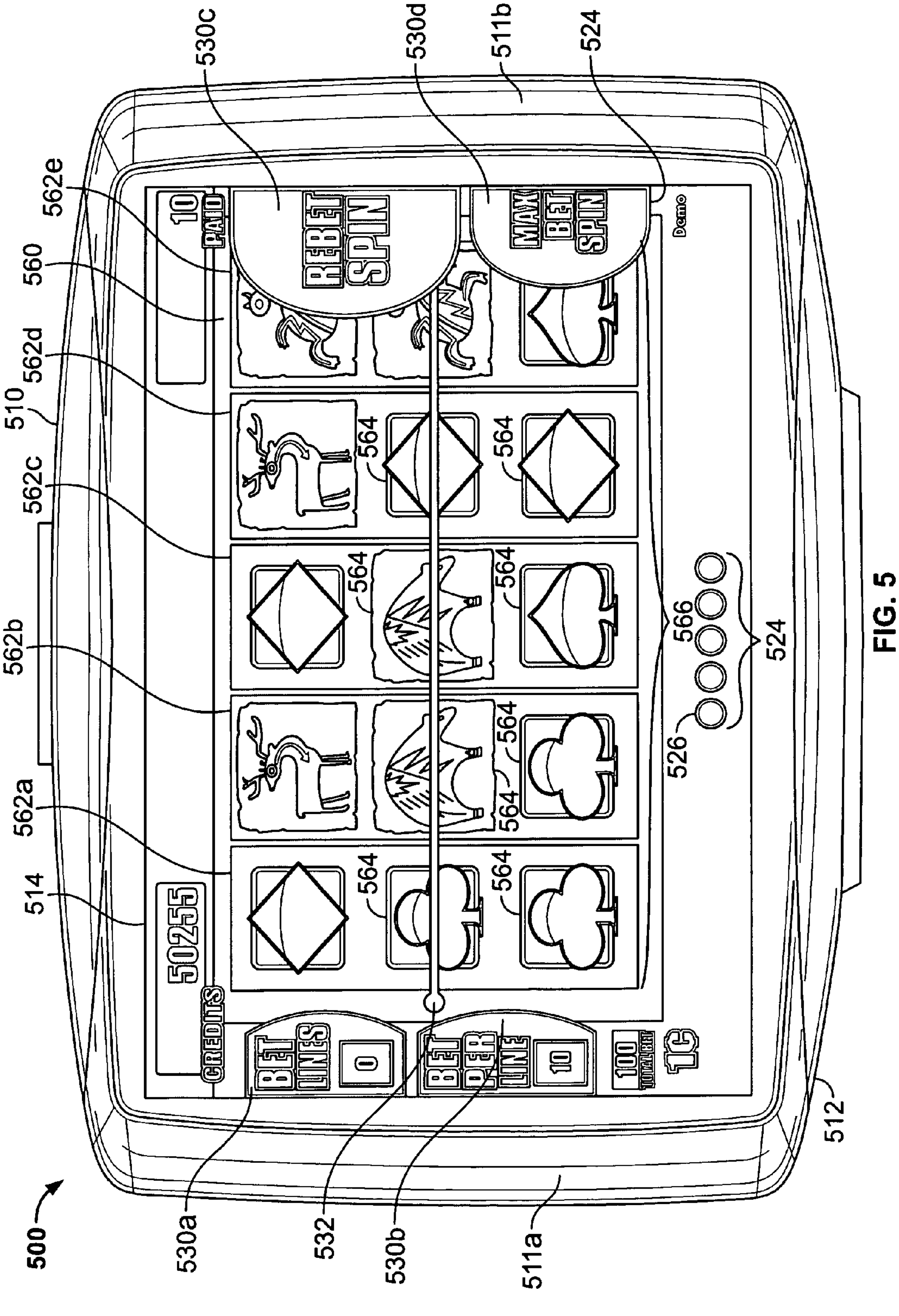
FIG. 5 is a front view of an alternative embodiment of a handheld gaming device including dynamic player inputs.
Figure 6:
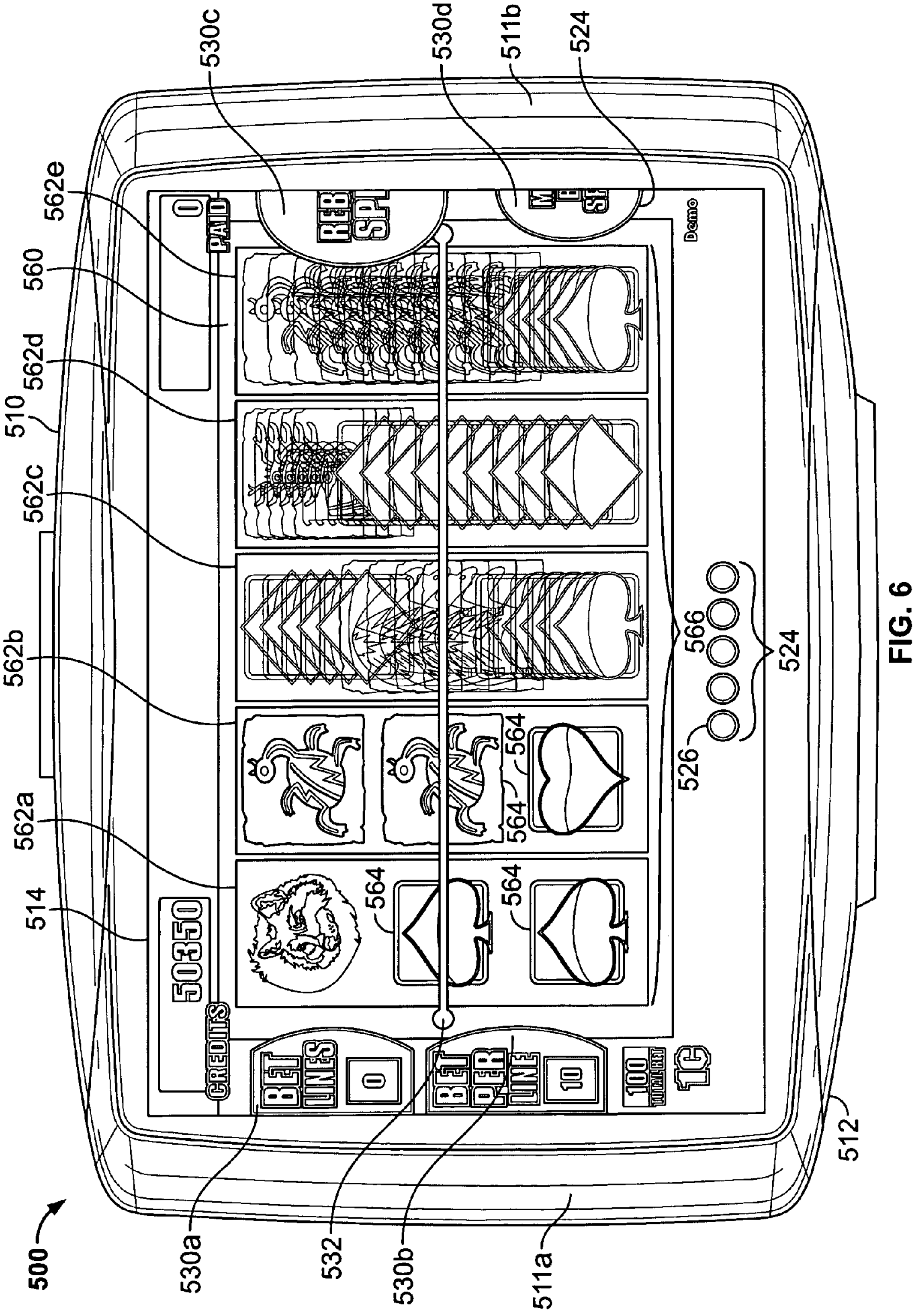
FIG. 6 is a further view of the handheld gaming device of FIG. 4 depicting a play of the primary wagering game displayed thereon.
Figure 7:
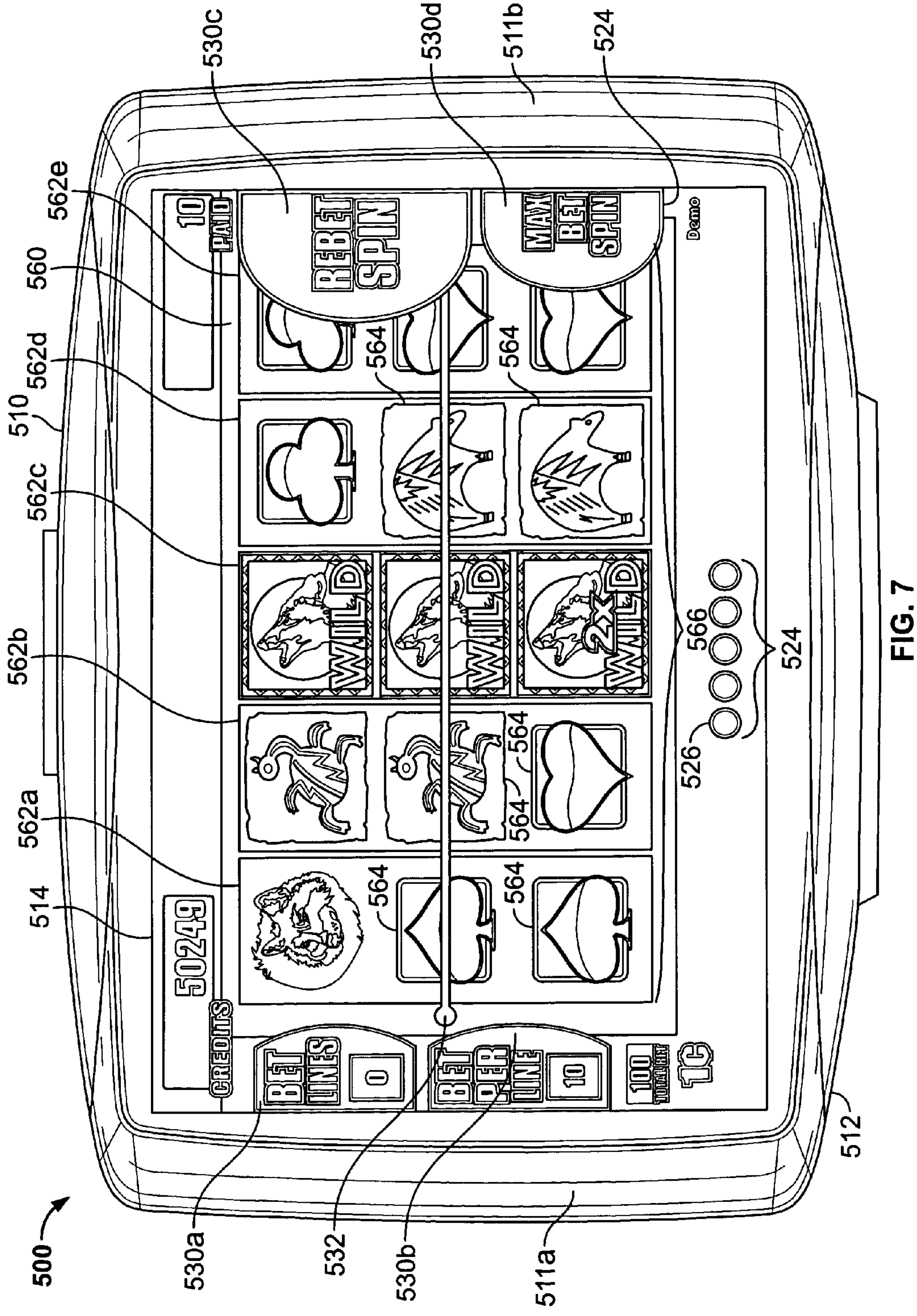
FIG. 7 is a further view of the handheld gaming device of FIG. 4 depicting a conclusion of the primary wagering game displayed thereon.

An alternative embodiment of a gaming system 500 including a handheld gaming device 510 is displayed in FIGS. 5-7 and described herein with reference to the same. In FIG. 5, the handheld gaming device 310 is displayed. Like the embodiment in FIG. 3, this embodiment includes a primary display 514 displaying a primary wagering game 560 having a plurality of reels 562 with symbols 564 thereon, arranged in an array 566. One or more paylines 532 pass through the array 566 and may be activated by placing a wager thereon. Two hand grips 511*a,b* are affixed to a housing 512 of the handheld gaming device 510 proximate the left and right edges of the primary display 514. A player input device 524 is provided in the form of one or more mechanical or electro-mechanical buttons 526 supported by the housing. The player input device 524 further includes a plurality of touch keys 530 splayed on the display 514 where inputs thereto are sensed by a touch screen 528 overlying the display. As with the embodiment in FIG. 3, the touch keys 530 include a Lines Bet button 530*a*, a Bet Per Line button 530*b*, a Rebet Spin button 530*c*, and a Max Bet Spin button 530*d*, which have the same functions are described with reference to FIG. 3.

Turning to FIG. 6, a play of the wagering game 560 is initiated by pressing either one of the spin buttons 530*c,d* which in this embodiment are also dynamic buttons. Once pressed, the wagering game 560 commences and the reels 562 are spun and stopped to display a randomly selected outcome of symbols 564 of the wagering game. During play of the wagering game 560, the dynamic spin buttons 530*c,d* are again altered or changed to improve visibility of the primary wagering game 560. Specifically, the dynamic buttons 530*c,d* are resized, moved, or relocated to reveal a previously concealed portion of the wagering game 560, such as the fifth reel 562*e* in FIGS. 5-7. In the embodiment shown in FIG. 6, the spin buttons 530*c,d* are made smaller and shifted to the right so as to reveal the portion of the primary wagering game 560 concealed in FIG. 5 (the fifth reel 562*e* and the symbols 564 thereon). Thus, unlike the dynamic buttons of the embodiment in FIGS. 3 and 4 which are made transparent or translucent, the dynamic spin buttons 582*c,d* of this embodiment are resized and relocated during play of the primary wagering game 560. In this way, by shrinking and moving the dynamic spin buttons 530*c,d* more of the primary wagering game 560 is seen. Likewise, when the wagering game 560 is inactive, the spin buttons 530*c,d* are larger, and more easily viewed and activated.

In FIG. 7, a conclusion of the play of the wagering game 560 of FIG. 6 is displayed. The reels 562 have come to a stop to reveal a randomly selected outcome of symbols 564 which are evaluated for winning combinations in accordance with a pay table of the wagering game 560. If any winning combinations of symbols 564 have landed on an active payline 532, then one or more awards or prizes is awarded to the player.

The dynamic touch keys 530*c,d* are returned to their original size, shape, and location (see FIG. 5) once the play of the wagering game 560 is complete. Thus, the dynamic buttons 530*c,d* work in conjunction with the wagering game 560 such that the dominant feature is displayed on the display 514 so as to occupy a greater area or more real estate of the display 514. Therefore, when the spin buttons 530*c,d* are activated and ready to receive an input, they are displayed larger and overlying a portion of the wagering game 560. However, when the wagering game 560 is active (e.g. the reels are spinning), the dynamic buttons are reduced in size and moved so that more of the primary wagering game 560 is visible. This sharing of the area of the display 514 permits more features of to be displayed on a smaller display 514 by enhancing active features and dynamically deactivating, removing, or reducing non-active features.

It should be understood that a number of techniques may be utilized with the dynamic touch keys described herein, so to minimize the area or territory of the display occupied by the touch keys when not in use. Thus, in the embodiments depicted herein, the soft keys can be made transparent, made translucent, reduced in size, relocated, or moved. In other embodiments, other characteristics of the dynamic soft keys may be manipulated so as to reduce their visual impact while inactive. For example, the colors of the dynamic soft keys can be changed, as can the fonts or other attributes displayed. Moreover, portions of the dynamic soft keys can be removed (such as the label on the Lines Bet buttons) which are unnecessary or less important during play of the wagering game. In yet other embodiments, these manipulation methods may be combined. For example, a dynamic soft key may be resized, relocated, and made transparent, thereby combining the techniques shown in FIGS. 4 and 6.

Moreover, it should be understood that different dynamic soft keys may be manipulated differently. One or more soft keys may be resized while inactive, while other soft keys are made translucent, while yet other soft keys change color, etc. Some soft keys may not be dynamic at all, and may remain fixed and visible on the display at all times during play, such as the Lines Bet buttons displayed in the FIGURES. In yet other embodiments, a player may be permitted to customize the dynamic nature of the dynamic soft keys. A player who prefers the transparent version of the soft keys 330*c,d* in FIG. 4 may elect that method of dynamic deactivation over the resized and relocated soft keys 530*c,d* of FIG. 6, or vice versa. Moreover, the form of dynamic deactivation may be set by an operator of the gaming system, or may be a function of what type of wagering game is being executed, or a function of one or more outcomes therein. Many different configurations of the dynamic deactivation techniques described herein may be utilized, alone or in conjunction with other such techniques. It should be further understood that the dynamic soft keys may be altered either before or during a play of the wagering game, so that an altered display of the soft keys is presented while the wagering game is being executed or displayed.

Although the embodiments displayed in the FIGS. 3-7 are handheld gaming devices, it should be understood that the methods of dynamic deactivation described herein may be equally applied to other displays and other gaming devices of a gaming system. For example, the display of a free standing gaming device (such as the one described in relation to FIG. 1*a*) may be configured to dynamically deactivate one or more dynamic touch keys as described herein. Moreover, any display can be so configured, such as a community display (for example a plasma display with an overlying touch screen positioned proximate a plurality of freestanding gaming devices).

The systems, devices and methods described herein offer a number of benefits and advantages over traditional gaming systems. The dynamic soft keys of the present invention provide a method of maximizing the use of display screen area by enlarging soft keys when they are active and "minimizing" the soft keys when they are inactive. In this way, a smaller display can accomplish the same tasks as a relatively larger display by sharing screen space among active and inactive elements. The dynamic soft keys provide a player with an easy to use player input device, while simultaneously providing a presentation of a wagering game which is as large as possible to utilize the limited screen area available. Other advantages are provided as well.

Each of these embodiments and obvious variations thereof is contemplated as falling within the spirit and scope of the claimed invention, which is set forth in the following claims.

What is claimed is:

1. A gaming system comprising:
- a wager input device;
- a display for displaying a primary wagering game;
- a touch screen overlying at least a portion of the display; and
- a controller operative to:
  - (i) cause the display to display at least one soft key having an activated state in which the at least one soft key is overlying and at least partially concealing a first portion of the display corresponding to a symbol position utilized to display a game symbol in an outcome of the primary wagering game;
  - (ii) cause the display to display a play of the primary wagering game; and
  - (iii) during the play of the primary wagering game, cause the display to alter a display of the at least one soft key to reveal, in a deactivated state of the at least one soft key, the symbol position and game symbol associated with the game symbol position, such deactivated state occurring during play of the primary wagering game and ending upon conclusion of the play of the primary wagering game,
    - wherein the altered display of the soft key is selected from the group consisting of a change in the translucence of at least a portion of the soft key, at least a portion of the soft key being made transparent, a reduction in size of the soft key, and a moving or relocation the soft key on the display.

2. The system of claim 1, wherein the controller is further operative to detect a first player input on the touch screen associated with the at least one soft key.

3. The system of claim 2, wherein the first player input initiates the play of the primary wagering game.

4. The system of claim 1, wherein the altered display of the soft key comprises a change in the translucence of at least a portion of the soft key.

5. The system of claim 4, wherein the at least a portion of the soft key is made transparent.

6. The system of claim 1, wherein the altered display of the soft key comprises a reduction in size of the soft key.

7. The system of claim 1, wherein the altered display of the soft key comprises a moving or relocation the soft key on the display.

8. A method of operating a wagering game on a wagering game system comprising a wagering game device, the method comprising:
- receiving a wager via a wager input device of the wagering game device;
- displaying a primary wagering game on a first display device of the wagering game device;

displaying on the first display device a first soft key having an activated state and a deactivated state, wherein in the activated state the at least one soft key is overlying and concealing a first portion of the primary wagering game corresponding to a symbol position utilized to display a game symbol in an outcome of the primary wagering game displayed on the first display device;

detecting a player input to the first soft key and initiating play of the primary wagering game subsequent thereto; and during the play of the primary wagering game on the wagering game device, displaying on the first display device the first soft key in the deactivated state, wherein in the deactivated state the first soft key is displayed as an altered version revealing at least part of the first portion, the deactivated state persisting until the play of the primary wagering game is concluded, wherein in the activated state the first soft key is configured to register a player input, and wherein in the deactivated state the first soft key is configured not to register a player input.

9. The method of claim 8, wherein the altered version of the first soft key comprises a change in one or more of a size, translucence, and location of the first soft key on the first display device.

10. The method of claim 8, wherein the wagering game device is a handheld gaming device and wherein the first display device is supported by a housing of the handheld gaming device.

11. The method of claim 10, wherein the handheld gaming device includes at least one hand grip, wherein the first soft key is displayed proximate the at least one hand grip.

12. The method of claim 8, further comprising displaying a second soft key on the first display device.

13. The method of claim 12, wherein the second soft key overlies and conceals a second portion of the primary wagering game displayed on the first display device.

14. The method of claim 13, further comprising, during play of the primary wagering game on the wagering game device, displaying on the first display device an altered version of the second soft key to reveal at least part of the second portion.

15. A method of operating a wagering game on a wagering game system comprising a wagering game device, the method comprising:

receiving a wager via a wager input device of the wagering game device;

displaying a primary wagering game on a first display device of the wagering game device;

displaying on the first display device a soft key overlying and concealing a first portion of the primary wagering game displayed on the first display device;

detecting a player selection of the soft key via a touch screen overlying the first display;

responsive at least in part to the player selection of the soft key, initiating the primary wagering game; and prior to a conclusion of the primary wagering game, altering the display of the soft key on the first display device to reveal at least part of the first portion, the altered display of the soft key corresponding to a deactivated state in which the soft key is rendered unable to register a player input until the play of the primary wagering game on the wagering game device is concluded.

16. The method of claim 15, wherein altering the display of the soft key on the first display device comprises one or more of resizing the soft key, changing the translucence of the soft key, and moving the soft key.

17. The method of claim 15, wherein the primary wagering game comprises a plurality of reels, the plurality of reels having a plurality of symbols thereon.

18. The method of claim 17, wherein the first portion of the primary wagering game comprises at least one of the plurality of symbols.

19. The method of claim 15, further comprising, upon conclusion of the play of the wagering game, restoring the soft key to an initial state overlying and concealing the first portion.

20. One or more non-transitory computer readable storage media encoded with instructions for causing at least one processor to perform acts comprising:

registering a wager input into a wager input device of the wagering game device;

displaying a primary wagering game on a first display device of the wagering game device;

displaying on the first display device a soft key overlying and concealing a first portion of the primary wagering game displayed on the first display device, the soft key being configured to provide at least one of a wager input or a primary wagering game start input;

detecting a player selection of the soft key via a touch screen overlying the first display;

subsequent to the player selection via the soft key, initiating play of the primary wagering game; and prior to a conclusion of the play of the primary wagering game, altering the display of the soft key on the first display device to reveal at least part of the first portion, the altered display of the soft key being deactivated until the play of the primary wagering game on the wagering game device is concluded.

21. A gaming system comprising:

at least one input device including a touch screen;

at least one display device for displaying a wagering game having a plurality of symbol-bearing positions;

at least one processor; and at least one memory device storing instructions that, when executed by the at least one processor, cause the gaming system to:

prior to populating symbol-bearing positions with respective symbols representing an outcome of the wagering game, display at least one soft key at least partially concealing a symbol-bearing position of the plurality of symbol-bearing positions, and receive a player input corresponding to at least one of a wager input or a primary wagering game start input via the touch screen at a location of the at least one soft key; and while populating the symbol-bearing positions with the respective symbols representing the outcome of the wagering game, alter the display of the at least one soft key to reveal the symbol-bearing position and any symbol in that symbol-bearing position.

* * * * *